United States Patent Office 2,913,455
Patented Nov. 17, 1959

2,913,455

18-DIMETHYLAMINO STEROIDS AND INTERMEDIATES

Raphael Pappo, Skokie, Ill., assignor to G. D. Searle & Co., Chicago, Ill., a corporation of Delaware No Drawing. Application May 22, 1958
Serial No. 736,963

4 Claims. (Cl. 260—239.5)

The present invention relates to a new group of 18-dimethylamino steroids, to intermediates used in their preparation and to processes for converting conessine to intermediates useful in the preparation of 18-amino and 18-hydroxy steroids.

The nomenclature for the pentacyclic nitrogen compounds in the description given hereinbelow, is that of Haworth and Michael, Journal Chem. Soc. 1957, 4973 who refer to the structure

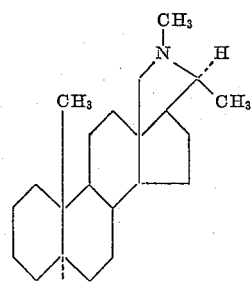

as conanine.

According to the process of this invention conessine is first converted to 3-dimethylamino-6-oxoconanine by the one of two processes. The first process uses a reaction with aluminum chloride and sodium borohydride to prepare a boron complex which is then oxidized with chromium trioxide in acetic acid to the 6-oxo derivative. The second process involves the treatment of conessine with nitric acid and sodium nitrite to prepare the 6-nitro derivative which is then treated with zinc and acetic acid to yield the 6-oxo compound.

The 3-dimethylamino group is then quaternized selectively and the resulting quaternary salt is subjected to treatment with alcoholic alkali to yield 3,5-cyclo-6-oxo-conanine of the structural formula

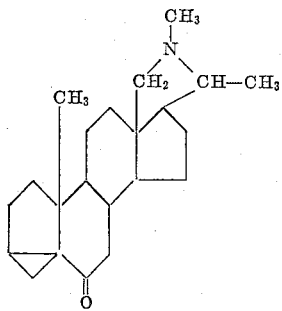

which is a valuable intermediate in a number of processes leading to the active pharmacological compounds. This compound also has inherent physiological properties of value and specifically it is a central nervous depressant.

This compound forms salts with inorganic and strong organic acids, including sulfuric, phosphoric, hydrochloric, hydrobromic, hydroiodic, sulfamic, citric, lactic, maleic, nicotinic, malic, succinic, tartaric, cinnamic, acetic, benzoic, gluconic, ascorbic, and related acids. It also forms quaternary ammonium salts with a variety of organic esters of sulfuric, hydrohalic and aromatic sulfonic acids. Among such esters are methyl chloride, bromide and iodide; ethyl chloride, propyl chloride, butyl bromide, isobutyl chloride, benzyl chloride, phenethyl chloride, naphthylmethyl chloride, dimethyl sulfate, methyl benzenesulfonate, ethyl toluenesulfonate, ethylene chlorohydrin, propylene chlorohydrin, allyl chloride, methallyl bromide and crotyl bromide.

The quaternary ammonium salts can be converted to the quaternary hydroxide or alkoxide and then heated under conditions allowing for removal of the water split off, typically by boiling in toluene with azeotropic distillation to yield 3,5-cyclo-18-dimethylamino-20-pregnen-6-one. This compound likewise forms salts with strong inorganic and organic acids. Not only the quaternary but also such tertiary salts as the hydrochloride produce ganglion block and are therefore useful in states of parasympathetic overstimulation. The base has the structural formula

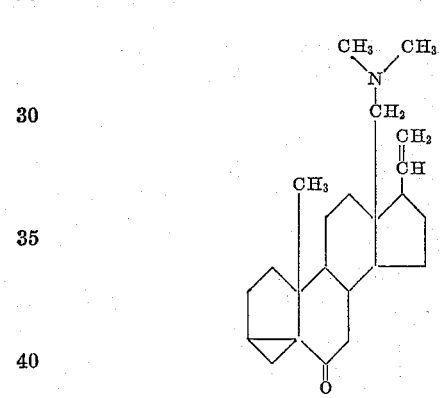

This compound can likewise be made more directly by preparing the bis-quaternary salt of 3-dimethylamino-6-oxoconanine, converting this salt to the bis-quaternary hydroxide or the corresponding alkoxide which is then heated under anhydrous conditions to yield 3,5-cyclo-18-dimethylamino-20-pregnen-6-one.

Besides being a pharmacologically active agent this compound is also an extremely useful intermediate in the synthesis of further steroids. Thus, on osmylation there is produced directly the 3,5-cyclo-18-dimethylamino-20,21-dihydroxy-6-pregnanone. Another method of producing this compound is to quaternize the 3,5-cyclo-18-dimethylamino-20-pregnen-6-one, e.g. with methyl p-toluenesulfonate and then treating this quaternary compound with osmium tetroxide to prepare the quaternary salt of the 20,21-diol which, on treatment with an alkoxide such as potassium tertiary butoxide yields the 3,5-cyclo-18-dimethylamino-20,21-dihydroxy-pregnan-6-one a compound with local anesthetic properties. As additional products there are obtained two 18-oxygenated steroids, namely 3,5-cyclo-21-hydroxy-18, 20-epoxypregnan-6-one and a compound which has been tentatively identified as 3,5-cyclo-20-hydroxy-18,21-epoxy-pregnan-6-one.

Reduction of 3,5-cyclo-6-oxoconanine with an alkali metal aluminum hydride, typically with lithium aluminum hydride, converts the 6-oxo group to a 6-hydroxy group. This compound is conveniently isomerized with formic acid so as to prepare the 3-formyloxy-5-conenine which can then be hydrolyzed to form the 3-hydroxy compound of the formula

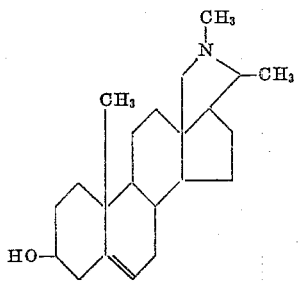

Oppenauer oxidation yields the progestationally active 3-oxo-4-conenine.

3-hydroxy-5-conenine, after being quaternized and converted to the quaternary hydroxide or alkoxide is then dehydrated by heating, preferably in an aromatic hydrocarbon solvent of 6 to 8 carbon atoms to yield the 18-dimethylamino-5,20-pregnadien-3-ol. This compound also forms salts with inorganic and strong organic acids and is a ganglion blocking agent. It can be converted by treatment with a peroxy acid to yield the N-oxide which, on treatment with a strong mineral acid in acetic acid yields 3-acetoxy-18-dimethylamino-5-pregnen-20-one; this ester can then be hydrolyzed to the free hydroxy compound. The quaternary salt of this compound undergoes an interesting reaction. After conversion to the quaternary hydroxide and heating there is obtained a mixture of 18,20-epoxy-5,20-pregnadien-3-ol and a compound which is presumably 3-hydroxy-17,18-cyclo-5-pregnen-20-one.

Esterification of 3,5-cyclo-18,20-epoxy-21-hydroxy-pregnan-6-one with toluenesulfonic acid followed by treatment of the resulting ester with an alkali metal alkoxide or hydroxide yields 3,5-cyclo-18,20-epoxy-17-pregnen-6-one. The same compounds are obtained on treating 3,5-cyclo-18,20-epoxy-21 hydroxy pregnan-6-one with thionyl chloride and reacting the resulting 21-chloro compound successively with base and then with aqueous acetic acid.

The invention will be described in further detail in the following examples which are given for the purpose of illustration only and are not to be construed as limiting the invention in spirit or in scope. It will be obvious to those skilled in the art that numerous modifications in the use of materials and operating conditions can be adopted without departing from the invention. In these examples quantities are indicated as parts by weight.

*Example 1*

To a stirred solution of 60 parts of sodium borohydride and 65 parts of aluminum chloride in 1000 parts of anhydrous β,β'-dimethoxydiethyl ether are added 80 parts of finely divided conessine. The walls of the vessel are washed with 100 parts of β,β'-dimethoxydiethyl ether and the mixture is stirred and heated under nitrogen at 60-70° C. for 10 hours. The mixture is then cooled in ice and treated cautiously with an excess of chilled hydrochloric acid. A large amount of hydrogen is evolved with simultaneous appearance of a grayish-white precipitate of sodium chloride. After standing for 12 hours at room temperature the mixture is filtered and the sodium chloride is washed with benzene. The combined filtrate and washings are treated with excess aqueous sodium hydroxide and the organic layer is separated by decantation. The aqueous layer is extracted with benzene and the combined organic solutions are dried over anhydrous sodium sulfate and concentrated under reduced pressure to a viscous gum. The boron compound thus obtained is dissolved in 800 parts of acetic acid and, while agitated, is treated in the course of 7 hours by the gradual addition of a solution of 200 parts of chromic anhydride in 200 parts of water while the temperature is maintained at 17-25° C. Agitation at room temperature is continued for 12 hours after which the mixture is stirred for 5 hours with 40 parts of 2-propanol and then concentrated under reduced pressure to a viscous residue which is diluted with water, cooled, stirred and treated by slow addition with an excess of a 40% aqueous sodium hydroxide solution. The deep green mixture is extracted repeatedly with a mixture of ether in benzene. The combined organic solutions are carefully washed with water, dried over anhydrous sodium sulfate and concentrated under reduced pressure to dryness. The residue is dissolved in a minimum amount of benzene, filtered to remove some insoluble material and the filtrate is taken to dryness to yield crystalline 3-dimethylamino-6-oxoconanine. The compound is sufficiently pure for the preparations described hereinbelow. Further purification can be achieved by filtering a benzene solution of this compound through 400 parts of an adsorbent containing 15% magnesium dioxide and 85% silicon dioxide and washing the adsorbent with a 1:1 mixture of ether in benzene. On concentration of the eluate and recrystallization of the residue from benzene and a petroleum ether the compound melts at about 198-203° C. The rotation of a 0.45% chloroform solution $\alpha_D$ is +11.1°. Infrared maxima are observed at 3.40, 3.50, 3.62, 5.88, 6.90, 7.24, 8.51 and 9.62 microns.

*Example 2*

A solution of 5 parts of conessine in 107 parts of 75% nitric acid is cooled in ice and treated in the course of 3 minutes with 3.75 parts of granular sodium nitrite with stirring. The reaction is permitted to proceed for 45 minutes without cooling and then diluted with ice, treated carefully with a mixture of concentrated ammonia and ice to raise the pH to 9 to 10 and extracted with ether. The extract is washed with water, dried over anhydrous sodium sulfate and concentrated to dryness under nitrogen. The residue crystallizes to an orange solid. Recrystallized from butanone the 6-nitroconessine melts at about 167-171° C. Infrared maxima are observed at 3.40, 3.50, 3.62, 6.58, 6.83, 6.92, 7.5, 7.36 and 9.65 microns. The ultraviolet absorption spectrum shows a very broad peak at 265 millimicrons in methanolic solution; the extinction coefficient is about 1600.

*Example 3*

A solution of one part of 6-nitroconessine and 15 parts of acetic acid and 2 parts of water is stirred with 2 parts of zinc dust. When the exothermic reaction has subsided the mixture is refluxed for 150 minutes, cooled in ice and made strongly alkaline with cold aqueous sodium hydroxide and extracted repeatedly with ether. The combined ether extracts are washed with water, dried with anhydrous sodium sulfate and evaporated to dryness under nitrogen to yield 3-dimethylamino-6-oxoconanine which, recrystallized from a mixture of ether and benzene melts at about 198-203° C. The compound forms a dinitrophenylhydrazone which decomposes at about 250° C.

*Example 4*

A solution of 29.4 parts of 3-dimethylamino-6-oxoconanine in 1000 parts of ether is treated with 15 parts of methyl p-toluenesulfonate. The homogeneous solution slowly deposits a crystalline white solid. After standing for about 11 days at room temperature the mixture is filtered and the crystalline solid is washed with ether and dried to yield the methotoluenesulfonate of 3-dimethylamino-6-oxoconanine. Unreacted tertiary amine can be recovered from the mother liquors by extraction with dilute aqueous hydrochloric acid.

*Example 5*

A solution of 1.5 parts of 3-dimethylamino-6-oxoconanine in 35 parts of ether is treated with 0.64 part of iodomethane. The methiodide is permitted to crystallize out and is then collected on a filter, washed with ether and dried to yield the methiodide of 3-dimethylamino-6-oxoconanine melting at about 230–240° C.

Example 6

A solution of 4.04 parts of the 3-methotoluenesulfonate of 3-dimethylamino-6-oxoconanine in 6 parts of methanol is treated with a solution of 1.5 parts of potassium hydroxide in 9 parts of methanol. A bulky crystalline precipitate forms within a few minutes. The mixture is then refluxed for 5.5 hours under nitrogen and concentrated almost to dryness under a stream of nitrogen on the steam bath. The residue is taken up in water and extracted twice with a mixture of ether and benzene. The extract is washed with water, dried over anhydrous sodium sulfate and concentrated to dryness under nitrogen to yield 3,5-cyclo-6-oxoconanine of the structural formula

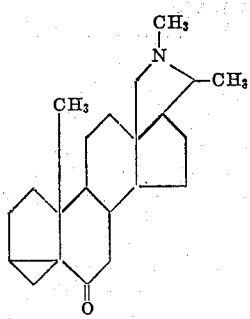

The compound melts at about 118–120° C. Infrared maxima are observed at 3.38, 3.41, 3.48, 3.6, 5.05, 6.90, 7.24, 7.65, 8.48 and 8.56 microns. A methanolic solution shows an ultra-violet maximum at 205 millimicrons with a molecular extinction coefficient of about 5150. The rotation of a 1% chloroform solution $\alpha_D$ is $+79.94°$.

Example 7

A suspension of 1 part of 3,5-cyclo-6-oxoconanine in 4 parts of anhydrous acetonitrile is treated with 5.7 parts of iodomethane. The mixture is heated at 40–45° C. for 5 days after which the solvent is removed under nitrogen and the residue is triturated with ether, filtered and washed with ether to yield the methiodide of 3,5-cyclo-6-oxoconanine melting at about 271–275° C.

Example 8

A solution of 30 parts of 3-dimethylamino-6-oxoconanine in 250 parts of methanol is refluxed and stirred with 114 parts of iodomethane for 12 hours under nitrogen. The mixture is then concentrated to about 120 parts and allowed to cool to room temperature. The crystals are collected on a filter, washed with methanol and dried to yield the bismethiodide of 3-dimethylamino-6-oxoconanine melting above 300° C.

The bis-methotoluenesulfonate is obtained as an amorphous solid by heating 3-dimethylamino-6-oxoconanine in excess methyl p-toluenesulfonate at 70° C. for 8 hours, then diluting with ether and filtering the resulting precipitate.

Example 9

A solution of 1.15 parts of 3,5-cyclo-6-oxoconanine methiodide in 20 parts of water and 2.5 parts of acetone is stirred with one part of silver oxide for 20 minutes. The mixture is then filtered and the filtrate is concentrated to dryness at room temperature under vacuum. The residue is diluted with toluene and the solvent is distilled slowly to remove the water formed in the reaction. The mixture is then refluxed azeotropically for 45 minutes longer and concentrated to a small volume. The residue is taken up in ether and water. The ether extract is dried over anhydrous sodium sulfate and concentrated to dryness under nitrogen to yield an oil which crystallizes on cooling. Recrystallized from acetonitrile there is obtained 3,5-cyclo-18-dimethylamino-20-pregnen-6-one in small cubes melting partially at about 73–75° C. resolidifying and remelting at 84–85° C. An additional crystalline modification, obtained in elongated prisms melting at about 87–88°, can be obtained from methanol. The compound has the structural formula

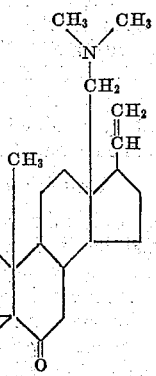

The infrared absorption spectrum shows maxima at 3.28, 3.40, 3.50, 3.62, 5.48, 5.93, 6.12, 6.87, 7.74, 8.65, 10.98 and 11.50 microns. The rotation of an 0.55% chloroform solution is $+51.0°$.

Example 10

An equivalent amount of the bis-methiodide of 3-dimethylamino-6-oxoconanine is substituted for the methiodide of 3,5-cyclo-6-oxoconanine used in the preceding example and the same product is obtained.

Alternatively, the bis-methotoluenesulfonate of 3-dimethylamino-6-oxoconanine is dissolved in methanol and treated with an excess of methanolic potassium hydroxide. The precipitate is removed by filtration and the filtrate is concentrated to a small volume. The residue is diluted with toluene and the mixture is stirred and slowly distilled for an hour. The resulting residue is taken up in ether and water and the ether extract is washed with water, dried over anhydrous sodium sulfate and concentrated to dryness. The residue, which crystallizes on cooling, is recrystallized from methanol to yield 3,5-cyclo-18-dimethylamino-20-pregnen-6-one melting at about 82–84° C.

The same result can be obtained with excellent yield using the following process. 55 parts of the bis-methiodide of 3-dimethylamino-6-oxoconanine are stirred and refluxed under nitrogen with a solution of 14 parts of potassium metal in 240 parts of tertiary butanol. After 4.5 hours 120 parts of solvent are removed by distillation and the residue is diluted with 540 parts of dry toluene and the distillation is continued. This process is repeated twice using two 240 part portions of anhydrous toluene. When a total of 900 parts of solvent has been distilled off the mixture is cooled in ice and stirred with ice and water. The organic layer is separated by decantation and washed with water. The combined aqueous phases are extracted with ether. The ether extract is washed with water and combined with the toluene layer. The organic extracts are dried over anhydrous sodium sulfate and concentrated to dryness under vacuum on the steam bath. On recrystallization from methanol there is obtained an initial crop melting at 86.5–87.5° C. which, on recrystallization from petroleum ether, forms elongated prisms melting at about 87–88° C. A second crop is obtained from methanol melting at about 85.5–86.5° C. A later crop melts at about 82.5–85° C. The material is thus obtained in different crystal forms of differing melting points.

Example 11

A solution of 0.5 part of 3,5-cyclo-6-oxoconanine in 12 parts of tetrahydrofuran is treated with 0.5 part of lithium aluminum hydride in 10 parts of tetrahydrofuran.

The mixture is refluxed for 30 minutes and then stirred at room temperature for 150 minutes under nitrogen. The solution is then treated successively with 0.53 part of water and 0.4 part of a 20% aqueous sodium hydroxide solution, 1.85 parts of water and diluted with ether. The mixture is filtered and the precipitate is washed with ether. The combined filtrates are taken to dryness under nitrogen on the steam bath and the crystalline residue is triturated with water, filtered and washed with water and dried to yield white crystals. Recrystallization from benzene yields 3,5-cyclo-6α-hydroxyconanine melting at about 181–184° C. The 6β-isomer can be obtained from the mother liquors.

Example 12

5.2 parts of the crude mixture of epimeric 6-hydroxy compounds obtained by lithium aluminum hydride reduction in the preceding example are dissolved in 127 parts of 98–100% formic acid and allowed to stand at room temperature for 48 hours. The mixture is then concentrated under reduced pressure at room temperature and the residue is refluxed for 4 hours with excess methanolic potassium hydroxide. The homogeneous solution is then concentrated under reduced pressure and the residue is diluted with water. The crystalline precipitate is collected on a filter, washed with water and dried. On recrystallization from benzene there are obtained colorless crystals melting at about 126–128° C. The infrared absorption spectrum of the 3-hydroxy-5-conenine thus obtained shows maxima at 3.12, 3.41, 3.6, 6.0, 7.9, 7.25, 8.52 and 9.50 microns. The rotation $\alpha_D$ is $-6.43°$ as determined in a 1% chloroform solution. The compound has the structural formula

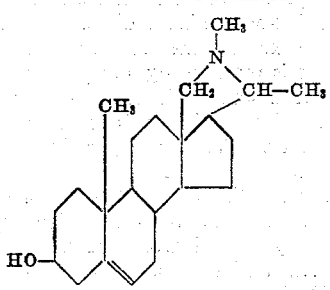

Example 13

The mixture of epimeric 3,5-cyclo-6-hydroxyconanines is treated as in the preceding experiment with formic acid. After removing the solvent under reduced pressure, the residue is taken up in water and ether and the mixture is treated with cold aqueous sodium hydroxide. The resulting precipitate is immediately taken up in ether and the organic layer is washed with water, dried over anhydrous magnesium sulfate, filtered and taken to dryness. The residue is crystallized on trituration with petroleum ether. There is thus obtained 3-formyloxy-5-conenine melting at 123–125° C.

Example 14

A mixture of one part of 3-hydroxy-5-conenine is heated with 2 parts of acetic anhydride and 2 parts of pyridine for 40 minutes at 60° C. and then poured into ice water. The crystals are collected on a filter and recrystallized from a mixture of benzene and petroleum ether to yield 3-acetoxy-5-conenine in thick prisms melting at about 155–158° C. The rotation $\alpha_D$ in 1% chloroform solution is $-12.63°$. Infrared maxima are observed at 3.4, 3.5, 3.6, 5.78, 5.98, 6.93, 7.23, 8.1, 9.65, 10.11, 11.1 and 12.55 microns.

Example 15

To a solution of 3.86 parts of 3-hydroxy-5-conenine in 12 parts of methanol are added 22.4 parts of iodomethane. The mixture is permitted to stand at room temperature for about 4 days and then concentrated under vacuum. The residue is triturated with 30 parts of acetone, filtered and washed with acetone and dried to yield the methiodide of 3-hydroxy-5-conenine melting at about 237–243° C.

Example 16

A suspension of 5.3 parts of finely divided 3-hydroxy-5-conenine methiodide in 45 parts of water and 5 parts of methanol is stirred at room temperature for 1 hour with 5 parts of silver oxide and then filtered. The filtrate is concentrated to a small volume at room temperature under reduced pressure and the residue is suspended in toluene. The suspension is stirred and distilled slowly over a one-hour period and then cooled and taken up in ether and water. The organic layer is separated, washed with water, dried and concentrated under nitrogen on the steam bath to yield 18-dimethylamino-5,20-pregnadien-3-ol melting at about 138–140° C. Infrared maxima are observed at 3.1, 3.41, 3.62, 6.00, 6.13, 6.85, 9.43, and 11.1 microns.

Example 17

A solution of 0.5 part of 18-dimethylamino-5,20-pregnadien-3-ol in 14 parts of ether is treated with 9 parts of an 0.165 molar solution of perbenzoic acid in benzene at room temperature. The mixture is advantageously seeded with the amine-oxide benzoate whereupon crystals start to form immediately. Otherwise crystallization has to be awaited on standing. The crystalline crop is collected on a filter and the crystals are washed with ether and dried. The benzoic acid salt of 3-hydroxy-18-dimethylamino-5,20-pregnadiene N-oxide is then triturated with a hot 10% aqueous sodium hydroxide solution. The resulting solid is collected on a filter, washed with sodium hydroxide, water, dried and washed again with ether to remove traces of unreacted starting material to yield 18-dimethylamino-5,20-pregnadien-3-ol N-oxide melting at about 202–204° C. The infrared absorption spectrum shows a broad absorption between 3 and 4 microns and maxima at 5.5, 6.00, 6.14, 6.82, 6.95, 7.45, 9.37, 10.71 and 11.01 microns.

Example 18

A solution of 7.5 parts of 18-dimethylamino-5,20-pregnadien-3-ol N-oxide in 15 parts of acetic acid and 18 parts of 36% hydrochloric acid is maintained at room temperature for 4 hours after which the solution is rendered alkaline by addition of cold aqueous sodium hydroxide and exhaustively extracted with ether. The ether extract is washed with water, dried and taken to dryness. The resulting oil is treated with 5 times its weight of acetic anhydride and 10 times its weight of pyridine and heated at 60° C. for 45 minutes. The mixture is then poured in water and the 3-acetoxy-18-dimethylamino-5-pregnen-20-one is thus obtained as a light brown oil. The infrared absorption spectrum shows maxima at 3.4, 3.6, 5.80, 5.92, 6.83, 7.25, 7.37, 7.98 and 9.70 microns.

The aqueous layer, remaining after the ether extraction, is heated on the steam bath for 30 minutes whereupon a white precipitate forms. Extraction of the reaction mixture with a mixture of ether in benzene yields in partially crystalline form 3-hydroxy-18-dimethylamino-5-pregnen-20-one.

Example 19

A solution of 0.5 part of 3,5-cyclo-18-dimethylamino-20-pregnen-6-one in 9 parts of benzene is added in the course of 3 minutes to a stirred solution of 1 part of osmium tetroxide in 9 parts of benzene. After 3 hours standing at room temperature the mixture is treated with 4.5 parts of methanol and 5 parts of sodium sulfite in 20 parts of water. After stirring for 60 hours at room temperature the mixture is filtered and the black precipitate is washed with benzene and ether. The filtered organic phase is separated by decantation, washed with water, dried and taken to dryness under vacuum and the residue is recrystallized from a mixture of ether and benzene and then from a mixture of methylcyclohexane and benzene to yield a mixture of the 20α and 20β-epimers of 3,5 - cyclo - 18 - dimethylamino - 20,21 - dihydroxypregnan-6-one. Infrared maxima are observed at 2.8 to 3, 3.4, 3.5, 3.6, 5.94, 6.8, 7.3, 7.7, 8.56, 9.5, 9.6, 9.8, 10.0, 11.45 and about 11.63 microns.

*Example 20*

A mixture of 3 parts of 3,5-cyclo-18-dimethylamino-20-pregnen-6-one in 30 parts of benzene and 12 parts of methyl p-toluenesulfonate is refluxed for 3 days. The solvent is then removed under nitrogen on the steam bath and ether is added slowly. The resulting precipitate is collected on a filter and washed with a mixture of ether in benzene and then dried. The resulting amorphous product is triturated with boiling benzene and the mixture is allowed to cool. There is thus obtained 3,5-cyclo-18-trimethylammonium-20-pregnen-6-one p-toluenesulfonate melting at about 205–210° C.

*Example 21*

To a solution of 2.7 parts of 3,5-cyclo-18-trimethylammonium-20-pregnen-6-one p-toluenesulfonate in 7.8 parts of anhydrous acetonitrile and 8 parts of benzene are added 1.5 parts of osmium tetroxide. The mixture is maintained at room temperature for 40 hours, after which it is diluted with 8 parts of acetonitrile and treated with excess hydrogen sulfide for 35 minutes. The resulting mixture is filtered and the precipitate is washed with acetonitrile, benzene and ethanol. The filtrate is taken to dryness to yield 3,5-cyclo-18-trimethylammonium-20,21-dihydroxypregnan-6-one p-toluenesulfonate.

To 0.7 part of this quaternary salt is added a solution of 1 part of potassium in 20 parts of tertiary butanol. The mixture is stirred with reflux under nitrogen for 2 hours, then diluted with water and concentrated under nitrogen on the steam bath. The aqueous residue is extracted with ether and the ether extract is washed with 20% aqueous sodium hydroxide, then with cold 3% aqueous hydrochloric acid, sodium hydroxide, and water and dried. On evaporation of the solvent a partially crystalline, neutral product is obtained which is triturated with ether. The 3,5-cyclo-18,20-epoxy-21-hydroxypregnan-6-one thus obtained has the structural formula

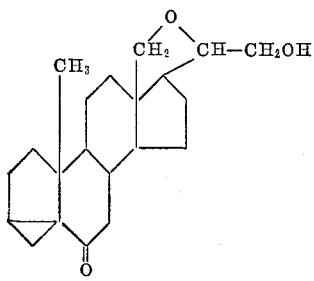

Recrystallized from benzene and then from methanol it melts at about 185–188° C. Infrared maxima are observed at 2.84, 3.40, 3.46, 5.95, 7.26, 7.67, 8.56, 8.83, 9.61, 9.70, and 11.95 microns. The mother liquor contains 3,5-cyclo-18,21-epoxy-20-hydroxypregnan-6-one.

The hydrochloric acid extract, after treatment with excess aqueous sodium hydroxide yields the crude 3,5-cyclo-18-dimethylamino-20,21-dihydroxy-6-pregnanone melting at about 185–195° C. The infrared spectrum was identical with that of a product obtained directly from the treatment of 3,5-cyclo-18-dimethylamino-20-pregnen-6-one with osmium tetroxide as described hereinabove.

*Example 22*

A solution of 0.194 part of 3-hydroxy-5-conenine in 45 parts of toluene and 3.6 parts of cyclohexanone is heated to reflux under nitrogen after which 15 parts of solvent are removed by distillation. Then 0.25 part of aluminum isopropoxide are added and the mixture is stirred at reflux for 35 minutes. The solution is cooled and acidified with excess aqueous sulfuric acid. The aqueous phase is separated, washed with ether, and rendered alkaline by addition of aqueous sodium hydroxide. The resulting precipitate is immediately extracted with ether and the ether extract is washed with water, dried and concentrated in vacuum under nitrogen. 3-Oxo-4-conenine is thus obtained as an oil. The ultraviolet absorption spectrum in a methanolic solution shows a maximum at 241 millimicrons with a molecular extinction coefficient of about 14,800. The infrared absorption spectrum shows no band characteristic of a hydroxy group but a very strong band at 6 microns.

*Example 23*

A solution of 0.241 part of 3,5-cyclo-18,20-epoxy-21-hydroxypregnan-6-one in 1.6 parts of pyridine is stirred with 0.226 part of p-toluenesulfonyl chloride. After 10 hours the mixture is cooled in ice and treated with 0.2 part of water for 30 minutes. The solution is then taken up in ether, washed successively with aqueous sulfuric acid, water, aqueous sodium hydroxide and again water and dried. The ether is removed under nitrogen on the steam bath and the residue is crystallized from ether to yield the p-toluenesulfonate of 3,5-cyclo-18,20-epoxy-21-hydroxy-pregnan-6-one melting at about 142–143° C.

What is claimed is:
1. A compound of the structural formula

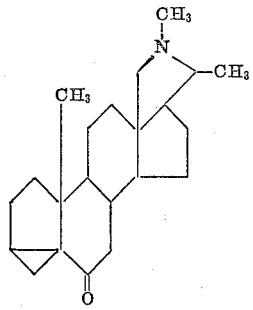

2. 3,5-cyclo-18-dimethylamino-20-pregnen-6-one.
3. 18-dimethylamino-5,20-pregnadien-3β-ol.
4. 3,5-cyclo-6-hydroxyconanine of the structural formula

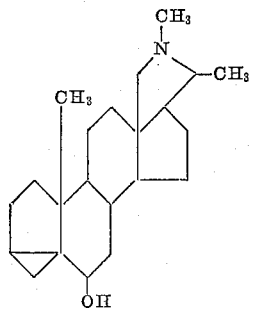

No references cited.